United States Patent [19]

Azuma

[11] 3,999,116
[45] Dec. 21, 1976

[54] POWER SOURCE SYSTEM FOR VEHICLES

[76] Inventor: Koichi Azuma, 22 Miyuki, Shikamaku, Himeji, Japan

[22] Filed: May 29, 1975

[21] Appl. No.: 582,409

Related U.S. Application Data

[63] Continuation-in-part of Ser. No. 451,708, March 15, 1974, abandoned.

[30] Foreign Application Priority Data

Nov. 27, 1973  Japan .............................. 48-133236

[52] U.S. Cl. ........................... 322/28; 317/33 VR; 322/59; 322/73; 322/DIG. 2
[51] Int. Cl.[2] ......................................... H02P 9/30
[58] Field of Search ................. 322/28, 59, 61, 68, 322/72, 73, DIG. 2; 317/33 VR; 323/22 SC

[56] References Cited

UNITED STATES PATENTS

| 3,379,958 | 4/1968 | Frysztak | 322/72 X |
| 3,548,288 | 12/1970 | Wyles | 322/28 |
| 3,579,087 | 5/1971 | Reinert | 322/28 |
| 3,697,859 | 10/1972 | Nordbrock | 322/28 |
| 3,771,045 | 11/1973 | Storz | 322/28 |

Primary Examiner—Gerald Goldberg
Attorney, Agent, or Firm—Wenderoth, Lind & Ponack

[57] ABSTRACT

A power source system for vehicles includes a transistor relay and a first triac to vary the amount of DC delivered to a field winding of a generator through a second triac, whereby stable AC and DC currents can independently be obtained.

2 Claims, 1 Drawing Figure

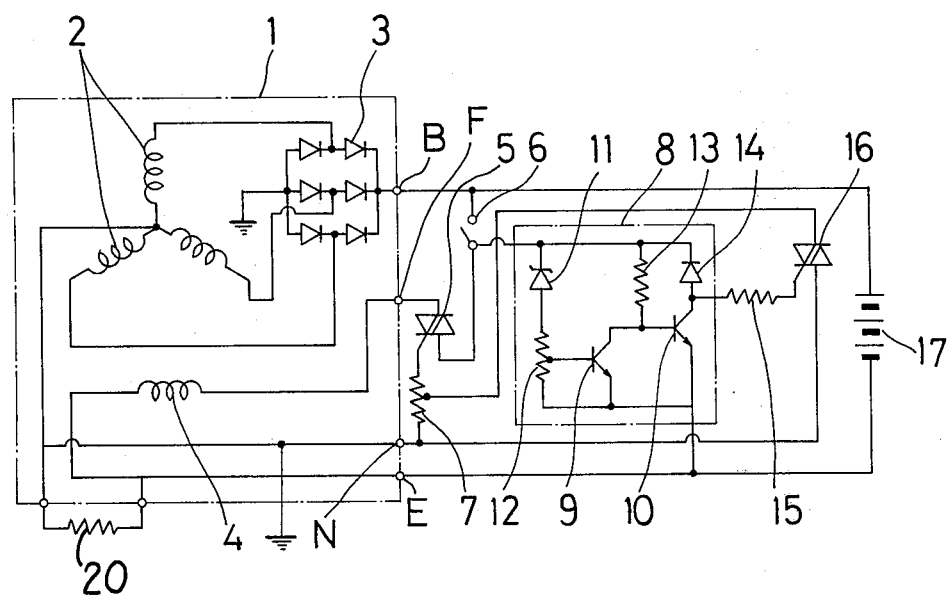

POWER SOURCE SYSTEM FOR VEHICLES

This is a continuation-in-part of application Ser. No. 451,708, filed Mar. 15, 1974, now abandoned.

BACKGROUND OF THE INVENTION

In conventional power source systems for use in vehicles it is common to use direct current, which is drawn from the generator through the battery.

However, in recent years there has been a trend toward providing vehicles with an increasing number of electrical conveniences, which trend has increased the electrical load and the capacity of vehicle batteries has necessarily been increased, resulting in an increase in the price of vehicles and an increase in their weight.

In charging conventional vehicle batteries, voltage regulators such as carbon pile systems or systems which operate according to the voltages generated by the generators, have been used. However, the size of these voltage regulators is quite large and therefore they occupy a considerable amount of space within the vehicle engine compartment. Furthermore, there are various problems relating to the operation and stability of these types of voltage regulators.

The aforesaid disadvantages are eliminated by a system according to the invention.

SUMMARY OF THE INVENTION

The present invention relates to a power source system for vehicles. It is an object of the present invention to provide a power source wherein alternating current is directly delivered to AC loads from the vehicle generator so that the DC load on the battery can be reduced.

BRIEF DESCRIPTION OF THE DRAWINGS

A complete understanding of the present invention may be obtained from the following detailed description of a specific embodiment thereof, when taken in conjunction with the accompanying drawing, in which:

The single FIGURE is a view of an electric system showing an embodiment of the invention.

DETAILED DESCRIPTION OF THE PREFERRED EMBODIMENT

Referring now to the drawing, there is shown a generator 1, surrounded by a chain line and comprising stator windings 2, a plurality of diodes 3 and a field winding 4. The generator further includes a DC output terminal B, a field winding terminal F, a neutral point N of the stator windings 2 and a grounded terminal E of the field winding. Resistor 20, connected between points N and E, is a load resistor for AC output from point N.

A first triac 5 is connected through the anode thereof to the field winding terminal F. A cathode of the first triac 5 is connected to the DC output terminal B via a key-switch 6, and a gate of the first triac is connected to the neutral point N through a first potentiometer 7. The switch 6 is an ignition switch, which is closed for operation of the circuit, and which connects the positive terminal of battery 17 to the vehicle ignition system (not shown).

A transistor relay is indicated generally by the numeral 8 and comprises an input transistor 9, an output transistor 10 and a constant voltage diode 11. The base of the input transistor 9 is connected to a second potentiometer 12. The constant voltage diode 11 and the second potentiometer 12 are connected in series between the cathode of the first triac 5 and ground. The emitter of the input transistor 9 is grounded, and the collector is directly connected to the base of the output transistor 10 while also being connected through a resistor 13 to the cathode of the first triac 5.

The emitter of the output transistor 10 is grounded, and the collector is connected through a diode 14 to the cathode of the first triac 5 and is also connected, through a resistor 15 to the gate of a second triac 16 which is connected between the potentiometer 7 and the neutral point N.

The battery 17 is connected via its anode to the DC output terminal B and has a grounded cathode.

Transistor relay 8 is first adjusted such that the input transistor 9 will be conductive whenever the base voltage $V_b$ exceeds the emitter voltage $V_e$ and such that the output transistor 10 will be inoperative whenever $V_b <  V_e$. This is achieved by appropriately adjusting the potentiometer 12. Also, the second triac 16 is placed in a nonconducting state by means of the resistor 15.

In accordance with the present invention, an AC load is coupled across the neutral point N of stator windings 2 and ground, and a DC load is suitably coupled to the battery 17.

Generator 1 outputs at point B pulsating current or a mixture of AC and DC which will be used to actuate or activate the triacs. DC along permits a triac to control just a small amount of current, while such pulsating current permits it to control a large amount of current.

The operation of the power source system comprising the above-mentioned circuit, is as described hereinafter.

Generator 1 starts to slowly rotate as a slight amount of alternating current from the neutral point of the generator is supplied to the gate of triac 5, allowing direct current to flow through winding 4 from the battery. Thus, when the generator 1 is slowly rotating, i.e. when the power output thereof is low, direct current is delivered to the field winding 4 through the first triac 5 from the battery 17.

Since the transistor relay 8 functions due to the above noted adjustments and since the second triac 16 is operative, the portion between the neutral point N and the intermediate point of potentiometer 7 is short-circuited. Thus, a large amount of alternating current is supplied to the gate of the first triac 5 through the resistor 7 from the neutral point N so that a large amount of DC is supplied to winding 4.

When the speed of rotation of the generator 1 increases and the generated voltage reaches a predetermined value, the transistor relay 8 is inoperative and causes the second triac 16 to become inoperative. Consequently, the resistance of potentiometer 7 increases and thereby decreases the DC applied to the field winding 4, stabilizing the generating current. The magnetic field (the magnetic flux density) is, when the system operates in this manner, stablized.

Thus, the rate at which dirrect current is supplied through triac 5 to the field winding may be varied with resistance 7 according to the rate of rotation of the generator. Therefore, a constant voltage power supply for both the AC load, directly connected across the stator winding of the generator and ground, and the DC load, coupled to the battery, can be supplied to the vehicle. This permits the most effective use of the various advantages of alternating and direct current. Furthermore, the load on the battery can be reduced so that the power requirements of the battery are correspondingly reduced. The simple combination of the transistor relay and triac can control the charging current of the battery without using contacts so that the configuration of the system is quite compact. Consequently, the space within the engine chamber occupied by the power source system can be reduced.

What is claimed is:

1. A power source system for vehicles, said system comprising:
    a generator including stator windings having a neutral point and a DC output terminal, and a field winding having a field winding terminal and a grounded terminal;
    a first triac connected across said DC output terminal of said generator and said field winding terminal;
    a first potentiometer, a gate of said first triac being connected to said neutral point of said stator winding through said first potentiometer;
    a second triac;
    a transistor relay;
    an intermediate point of said first potentiometer being connected through said second triac to both said transistor relay and to said neutral point of said stator winding, wherein said transistor relay and second triac operate to vary the rate of feeding of direct current to said field winding through said first triac, whereby stable alternating and direct currents are independently obtained.

2. The device of claim 1, wherein said transistor relay comprises a first transistor, a second transistor, and a second potentiometer, the base of said first transistor being coupled to an intermediate point of said second potentiometer, the emitter of said first transistor being grounded, and the collector of said first transistor being coupled to the base of said second transistor, the emitter of said second transistor being grounded, and the collector of said second transistor being coupled to both said second triac and said first triac, and said second potentiometer being connected between said first triac and ground.

* * * * *